United States Patent
Loke et al.

(10) Patent No.: US 6,675,024 B1
(45) Date of Patent: Jan. 6, 2004

(54) SYSTEM AND METHOD FOR RECEIVING ANALOG AND DIGITAL SIGNALS

(75) Inventors: Aravind Loke, Irvine, CA (US); Mohy F. Abdelgany, Irvine, CA (US); Dana Vincent Laub, Irvine, CA (US)

(73) Assignee: Skyworks Solutions, Inc., Irvine, CA (US)

(*) Notice: Subject to any disclaimer, the term of this patent is extended or adjusted under 35 U.S.C. 154(b) by 0 days.

(21) Appl. No.: 09/408,754

(22) Filed: Sep. 30, 1999

(51) Int. Cl.⁷ .............................. H04M 1/00
(52) U.S. Cl. ............. 455/553.1; 455/132; 455/143; 455/285
(58) Field of Search .............. 455/130, 132, 455/143, 144, 146, 553, 86, 84, 317, 285, 302

(56) References Cited

U.S. PATENT DOCUMENTS

| | | | | |
|---|---|---|---|---|
| 5,175,749 A | * | 12/1992 | Ficht et al. ................. 375/76 |
| 5,299,228 A | * | 3/1994 | Hall ............................. 375/1 |
| 5,339,048 A | * | 8/1994 | Weber ...................... 330/302 |
| 5,355,524 A | * | 10/1994 | Higgins, Jr. ................ 455/82 |
| 5,418,815 A | * | 5/1995 | Ishikawa et al. .......... 375/216 |
| 5,422,931 A | * | 6/1995 | Austin-Lazaus et al. ... 379/59 |
| 5,854,985 A | * | 12/1998 | Sainton et al. ............ 455/553 |
| 6,195,563 B1 | * | 2/2001 | Samuels ................... 455/553 |
| 6,278,722 B1 | * | 8/2001 | Evans ....................... 375/133 |
| 6,304,751 B1 | * | 10/2001 | King ......................... 455/306 |

* cited by examiner

Primary Examiner—Lee Nguyen
Assistant Examiner—Tuan Tran
(74) Attorney, Agent, or Firm—Christopher J. Rourk; Akin Gump Strauss Hauer & Feld, LLP

(57) ABSTRACT

A system for receiving a transmitted signal is provided. The system includes a first receiver that can receive the transmitted signal and decode the transmitted signal according to a first demodulation format, such as a CDMA or PCS format. A second receiver, such as an FM demodulator, is connected to the first receiver at a suitable location, such as after initial signal amplification and processing has been completed. The second receiver can decode the transmitted signal according to a second demodulation format, such as AMPS.

20 Claims, 4 Drawing Sheets

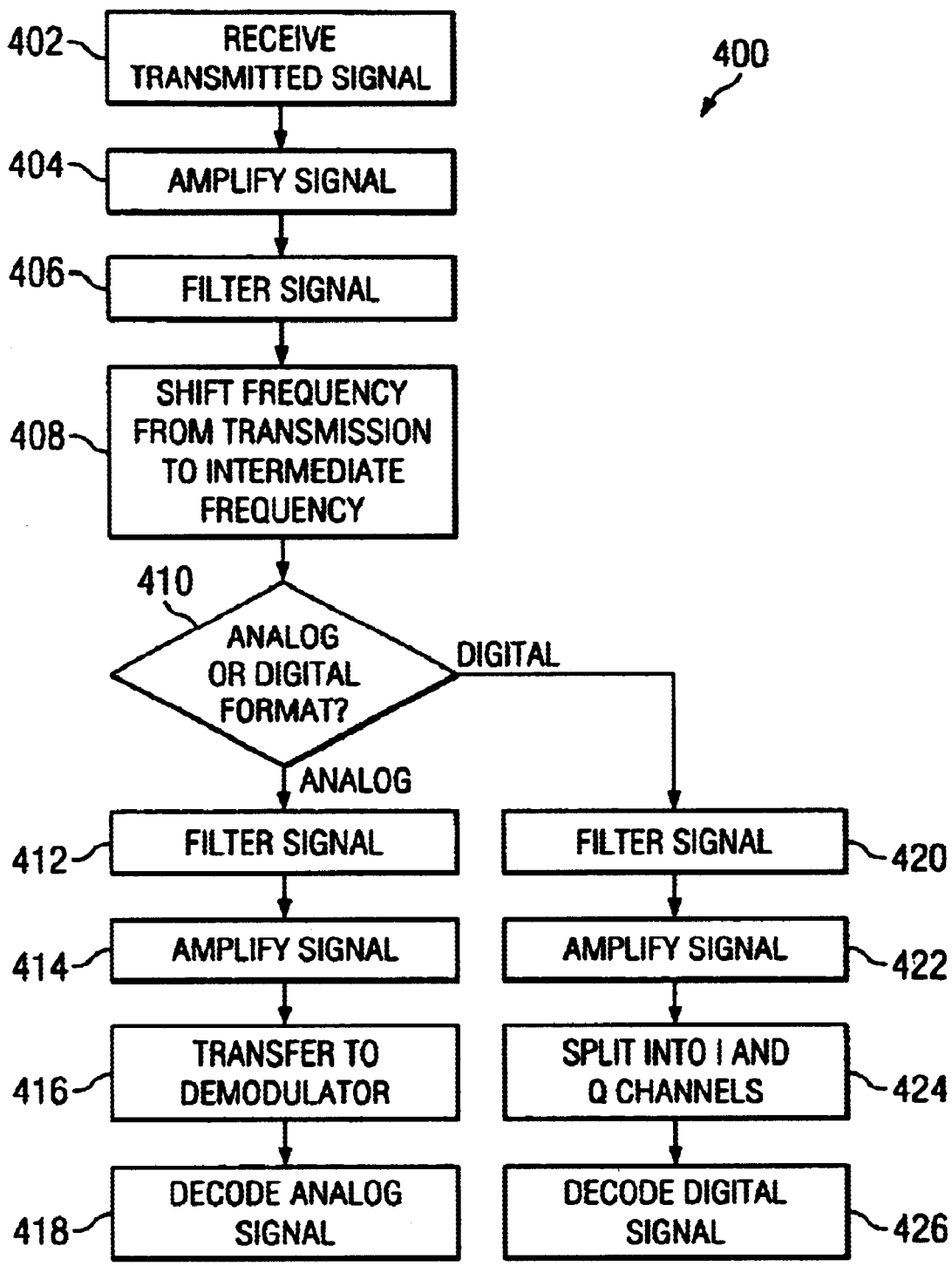

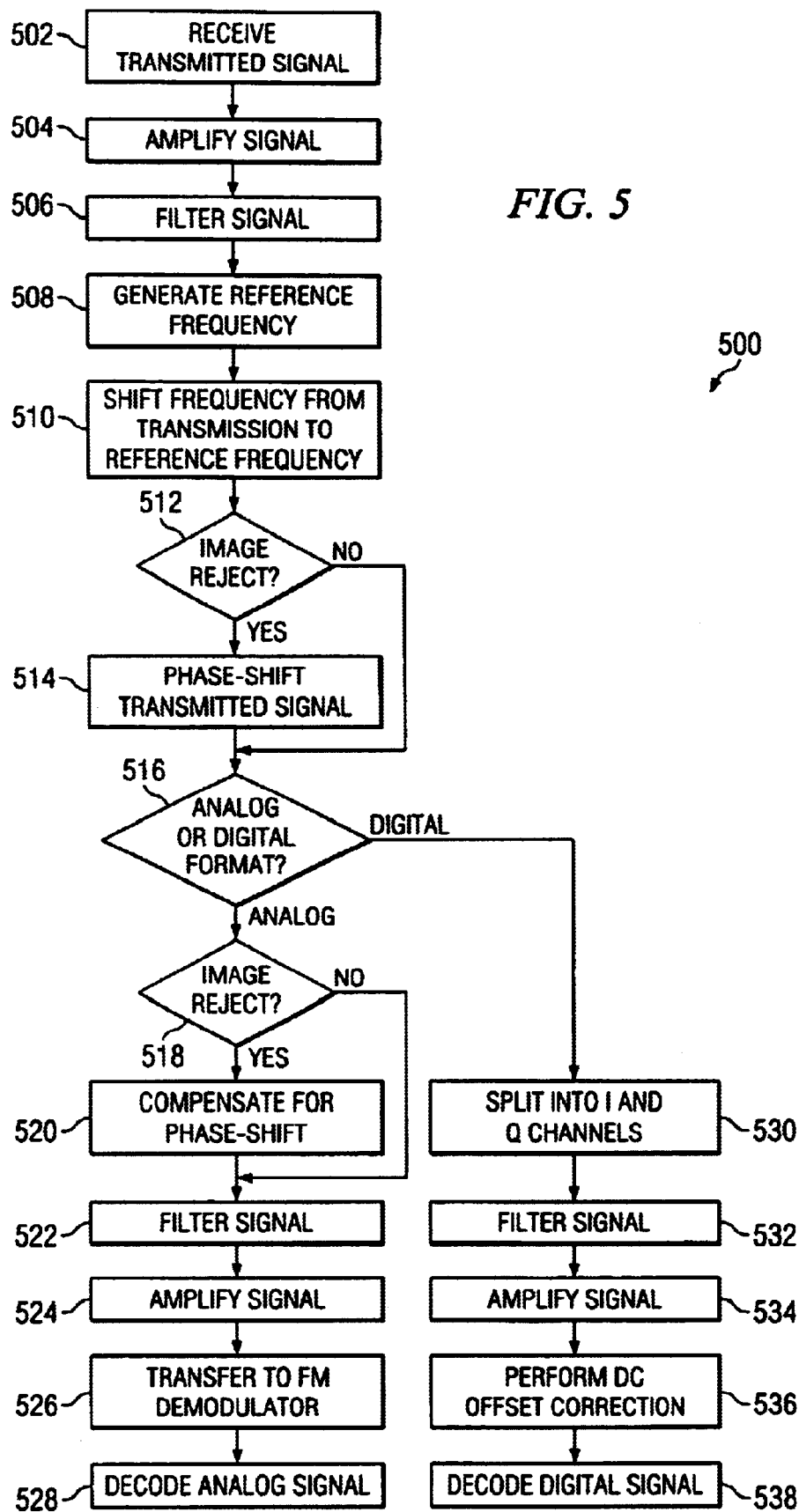

SYSTEM AND METHOD FOR RECEIVING ANALOG AND DIGITAL SIGNALS

FIELD OF THE INVENTION

The present invention pertains to receivers, and more particularly to a system and method for receiving analog and digital signals that results in lower power consumption than known systems and methods for receiving analog and digital signals.

BACKGROUND

Dual mode receivers for cellular handsets are known in the art. Such dual mode receivers are typically used to process a signal that may be encoded using an analog format, such as the Advanced Mobile Phone Service (AMPS) format, or in a digital format, such as a code division multiple access (CDMA) or Personal Communications Services (PCS) format. The dual mode receivers allow a cellular telephone handset to receive signals in a variety of formats, thus allowing different service providers to use the same cellular handsets. In addition, the same cellular handset may be used in areas that provide service according to different formats, such that users may roam outside of a service area of their service provider and may still use the cellular services of another service provider.

Although such dual mode receivers are known, they suffer various drawbacks and shortcomings. In order to allow analog or digital format signals to be processed, it is necessary to either provide completely separate receivers, or to process analog encoded signals using the digital signal processing systems and components that are used for digitally-encoded signals. Such digital processing of analog signals requires significantly greater power than processing of digital signals, which results in increased battery power consumption. Likewise, providing separate digital and analog receiver chains duplicates many components, which also increases power consumption. In addition, dual receiver chains increases the cost of the receiver, the weight of the receiver, and the size of the receiver.

SUMMARY OF THE INVENTION

In accordance with the present invention, a system and method for receiving a signal are provided that overcome the problems and deficiencies of known systems and methods for receiving a signal.

In particular, a system and method for receiving a signal are provided that allow analog encoded signals to be decoded using analog systems and components, and digitally-encoded signals to be decoded using digital systems and components, so as to optimize the power required to demodulate the signal, regardless of the type of signal received.

In accordance with an exemplary embodiment of the present invention, a system for receiving a transmitted signal is provided. The system includes a first receiver that can receive the transmitted signal and decode the transmitted signal according to a first demodulation format, such as a CDMA or PCS format. A second receiver, such as an FM demodulator, is connected to the first receiver at a suitable location, such as after initial signal amplification and processing has been completed. The second receiver can decode the transmitted signal according to a second demodulation format, such as AMPS.

The present invention provides numerous important technical advantages. One important technical advantage of the present invention is a system for receiving a signal that may be encoded in an analog format or a digital format that allows conventional analog systems and components to be used to demodulate and process analog signals. The present invention thus eliminates the need to process analog encoded signals using digital signal processing systems and components, which may require increased amounts of power to process analog encoded signals as compared with digitally encoded signals.

Those skilled in the art will further appreciate the advantages and superior features of the invention together with other important aspects thereof on reading the detailed description which follows in conjunction with the drawings.

BRIEF DESCRIPTION OF THE DRAWINGS

FIG. 4 is a flow chart of a method for receiving a transmitted signal that may be encoded in an analog or digital format, in accordance with an exemplary embodiment of the present invention.

FIG. 5 is a flow chart of a method for receiving a transmitted signal in accordance with an exemplary embodiment of the present invention.

DETAILED DESCRIPTION OF PREFERRED EMBODIMENTS

Figure 1:
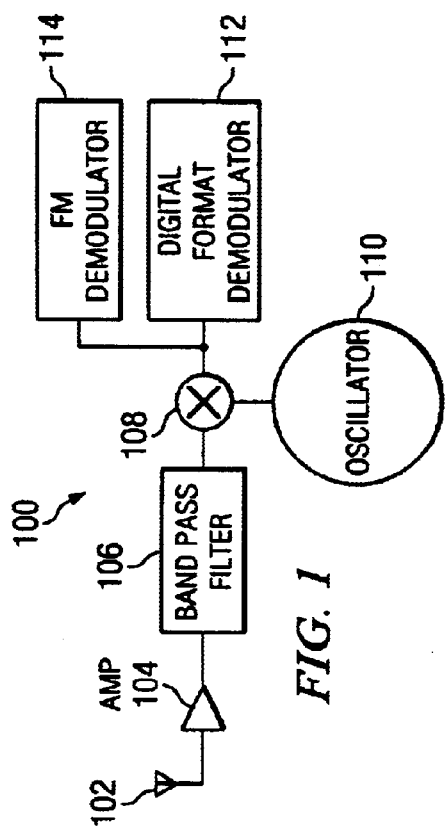
FIG. 1 is a diagram of a system for receiving a transmitted signal in accordance with an exemplary embodiment of the present invention.

In the description which follows, like parts are marked throughout the specification and drawing with the same reference numerals, respectively. The drawing figures may not be to scale and certain components may be shown in generalized or schematic form and identified by commercial designations in the interest of clarity and conciseness.

FIG. 1 is a diagram of a system 100 for receiving a transmitted signal in accordance with an exemplary embodiment of the present invention. System 100 may be used to receive dual mode signals in an analog format and a digital format, or other suitable combinations of formats.

System 100 includes antenna 102. Antenna 102 may be a monopole antenna, a dipole antenna, a patch antenna or other suitable antennas, and is configured to receive transmitted signals in the form of electromagnetic radiation. Antenna 102 is coupled to amplifier 104, and passes the transmitted signal to amplifier 104. As used in this application, the term "couple" and cognate terms such as "couples" and "coupled" may include a physical connection (such as a conductor or data bus) or other suitable connections, and may include connections that occur through intervening systems and components. Amplifier 104 may be a low noise amplifier, a cellular handset receiver amplifier, or other suitable amplifiers. Amplifier 104 receives the base station transmitted signal from antenna 102 and amplifies the transmitted signal so that it may be processed by other components of system 100.

Band pass filter 106 is coupled to amplifier 104. Band pass filter 106 may be an analog filter that is configured to pass electrical signals having frequencies within a predetermined bandwidth. For example, band pass filter 106 may be a surface acoustic wave filter or other suitable filter that allows a predetermined frequency band of electrical signals to pass unattenuated, but which attenuates electrical signals that have a frequency that is outside of this band.

Band pass filter 106 is coupled to mixer 108. Mixer 108 functions as a mathematical multiplier of two input signals, such as the transmitted signal from the output of band pass filter 106 and a signal from the output of oscillator 110. Mixer 108 outputs a signal that corresponds to a frequency-shifted output from band pass filter 106. In the frequency domain, mixer 108 shifts the center frequency of the output from band pass filter 106 to the central frequency of oscillator 110, which typically operates at a fixed frequency. In this manner, the output of band pass filter 106 may be frequency shifted to a frequency band that is more suitable for subsequent processing.

Mixer 108 is coupled to digital format demodulator 112 and FM demodulator 114. Digital format demodulator 112 is configured to receive the output from mixer 108, so as to perform additional analog processing of the signal in preparation of providing the signal to a digital format processor (not explicitly shown). Likewise, FM demodulator 114 demodulates a signal that has been modulated according to a frequency modulation format. For example, in the AMPS standard format, the analog cellular phone signal is transmitted in a frequency modulated format. FM demodulator 114 demodulates signals transmitted in such formats for subsequent processing by an analog format processor (not explicitly shown).

In operation, system 100 is used to receive a signal that may be encoded in either a digital or analog format. This signal is received by antenna 102 and is then amplified and frequency shifted to produce a signal that has a predetermined magnitude, and which is centered at a predetermined bandwidth. This signal may then be demodulated by an FM demodulator 114 if it is an analog format signal, or by digital format demodulator 112 if it is a digital format signal, such as a CDMA format signal, a PCS format signal, a time division multiple access (TDMA) format signal, a frequency division multiple access (FDMA) format signal, a Global System for Mobile Communications (GSM) format signal, or other suitable signal formats. In this manner, analog format signals that have been frequency modulated do not need to be processed by digital signal processing circuitry of a digital format processor, which may require more power than conventional analog signal processing. Thus, system 100 may be used advantageously to decrease the power requirements for a dual mode receiver system.

Figure 2:
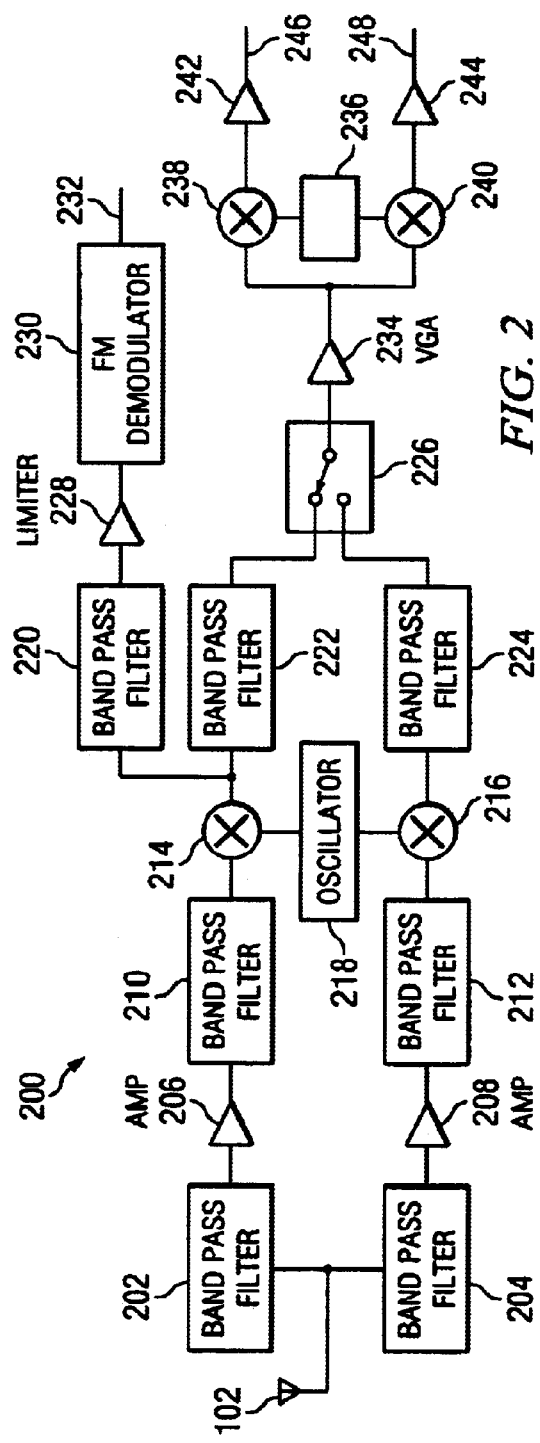
FIG. 2 is a diagram of a system for receiving analog and digital signals in accordance with an exemplary embodiment of the present invention.

FIG. 2 is a diagram of a system 200 for receiving analog and digital signals in accordance with an exemplary embodiment of the present invention. System 200 may be used in conjunction with a dual band super heterodyne cellular radio receiver, or for other suitable purposes.

System 200 includes antenna 102 which is coupled to band pass filters 202 and 204. Band pass filter 202 is configured to pass electrical signals that are encoded in accordance with predetermined formats, such as a CDMA format or an AMPS format. Band pass filter 204 is configured to pass electrical signals that are encoded in accordance with other formats, such as the PCS format. Band pass filters 202 and 204 may also or alternatively be configured so that other suitable analog and digital signal formats may be used.

After initial filtering from band pass filter 202, the transmitted signal is amplified by amplifier 206. The transmitted signal is then processed by a band pass filter 210, to remove any noise components that fall outside of the predetermined band for the signal, for example, such as noise components that may have been inadvertently introduced by amplifier 206. The signal is then frequency shifted by mixer 214, which receives a center frequency signal from dual band local oscillator 218. The transmitted signal is then transferred to analog filter 220 and digital format filter 222.

Analog filter 220 filters the transmitted signals such that a predetermined frequency band carrying frequency modulated signal data is allowed to pass. Limiter amplifier 228 receives the signal output by analog filter 220, and outputs an amplitude normalized signal. For example, if a signal received at limiter amplifier 228 varies in amplitude, the output of limiter amplifier 228 typically has a sinusoidally varying output with a constant peak magnitude. This output is received by FM demodulator 230, which is used to demodulate data that is encoded by frequency modulation of the signal. For such demodulation processes, amplitude variations are not significant. The signal is then transferred to FM demodulator 230, and the demodulated signal may be provided to an analog format processor (not explicitly shown) through output 232.

The transmitted signal is also received at digital format filter 222 from mixer 214. Digital format filter 222 performs additional filtering of the signal so as to pass signals having a frequency that occurs within a predetermined bandwidth, such as that associated with CDMA signals. The transmitted signal is then transferred through switch 226 to variable gain amplifier 234. Variable gain amplifier 234 amplifies the transmitted signal to a predetermined amplitude, and then provides the transmitted signal to mixers 238 and 240. Mixers 238 and 240 receive an oscillator signal from oscillator 236 and output a signal to I channel amplifier 242 and Q channel amplifier 244, respectively. I channel signal output 246 and Q channel signal output 248 are used to provide signals for decoding to a digital format processor (not explicitly shown).

System 200 may also include a dual mode digital format signal chain. In a dual mode digital format signal chain, the transmitted signal is filtered via a band pass filter 204, wherein the band is selected in accordance with a predetermined digital format standard. This signal is then transmitted to amplifier 208 and to filter 212, which amplify and filter the signal in accordance with a predetermined digital format, such as the PCS format. The center frequency of the frequency band of the signal is then shifted using mixer 216 and dual band local oscillator 218, and the center frequency adjusted signal is then filtered through digital format filter 224. If the dual mode second digital format is being received, switch 226 is configured such that it conducts the signal to variable gain amplifier 234, for subsequent processing and generation of an I channel signal at I channel signal output 246, and a Q channel signal at Q channel signal output 248.

In operation, system 200 is used to receive a transmitted signal that may include analog or digital encoded data. If the transmitted signal includes analog encoded data, such as AMPS cellular radio format data, then the signal is transmitted after initial signal processing to an analog signal receiver chain, such as an FM demodulator 230. The demodulated analog signal may then be provided for analog format processing, such as extraction of signaling, control, and payload data. Alternatively, if a digital format signal is received, a digital format demodulation chain receiver is used, and I channel and Q channel data signals are provided for digital format processing. The present invention thus provides an analog format signal without requiring the signal to be processed using digital format processing systems or components. In this manner, conventional analog format signal processing systems and components may be used that have lower power consumption characteristics than digital signal processing systems and components that have been adapted for processing the analog signal format.

Figure 3:
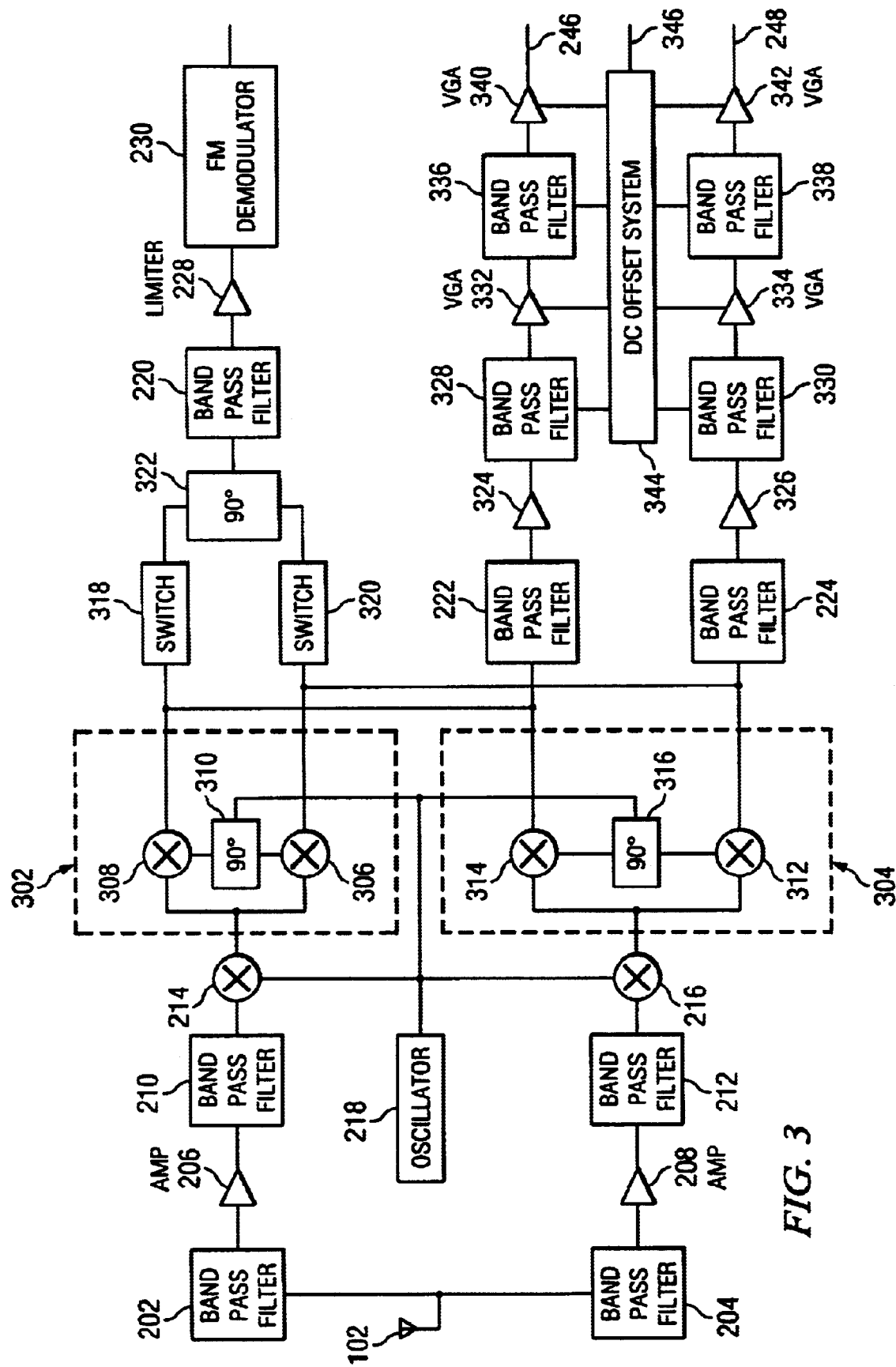
FIG. 3 is a diagram of a receiver for receiving multiple format analog and digital signals in accordance with an exemplary embodiment of the present invention.

FIG. 3 is a diagram of a receiver 300 for receiving multiple format analog and digital signals in accordance with an exemplary embodiment of the present invention. Receiver 300 may be used in a cellular telephone handset or in other suitable applications.

Receiver 300 includes antenna 102, which receives a transmitted signal. The transmitted signal is processed by band pass filters 202 and 204 and separated into two paths, similar to that of system 200. Subsequent to frequency shifting by mixers 214 and 216, the signal is processed by a single side band mixer that includes double balanced mixer 302 and I/O demodulator 304. This processing minimizes in-band local oscillator leakage signals or spurious signals that may have been generated by mixers 214 and 216, without creating the signal attenuation that would be introduced by a band-pass filter.

Double balanced mixer 302 includes mixers 306 and 308 and phase shifter 310. Phase shifter 310 introduces a 90° phase shift into the reference signal for mixers 306 and 308 as compared with the reference signal for mixer 214 and mixer 216. This phase shift is used to convert signals directly to baseband in-phase and quadrature signals. Likewise, I/O demodulator 304 includes mixers 312 and 314 which receive the signal from mixer 216 and multiply it by a reference signal that is phase shifted 90° by phase shifter 316, relative to the reference signal provided to mixers 214 and 216.

If analog signal processing is required, switches 318 and 320 will be closed such that the analog demodulation receiver chain receives the signal. The signal is first phase shifted by phase shifter 322 to compensate for phase shifting by phase shifters 310 and 316. The signal is then processed by band pass filter 220, limiter amplifier 228, and FM demodulator 230 to isolate the analog data signal. If switches 318 and 320 are not closed, then the transmitted signal may be processed for digital format data, such as by transmission to a first digital format filter 222 or a second digital format filter 224.

Receiver 300 also includes DC offset correction system 344, which may be implemented to compensate for DC offset or gain imbalance that may occur in the in-phase and quadrature amplifier chains. For example, filter 328, variable gain amplifier 332, filter 336 and variable gain amplifier 340 may each receive an input from DC offset correction system 344 that is used to correct for any DC offset that may be introduced into the signal. Likewise, for the Q channel signal, band pass filter 330, variable gain amplifier 334, band pass filter 338, and variable gain amplifier 342 may be used to compensate for any DC offset in the Q channel signal. I channel signal output 246 and Q channel signal output 248 provide a signal for digital processing to a digital format processor (not explicitly shown).

In operation, receiver 300 is used to receive a transmitted signal that may include data that has been encoded in an analog or digital format. Receiver 300 includes an I/O demodulator pair 302 and 304 that is used to convert radio frequency signals that are down-converted by mixers 214 and 216 to in-phase and quadrature baseband signals. Receiver 300 also includes DC offset correction system 344, which may be used to compensate for any DC offset that may have been introduced in the I channel signal and the Q channel signal. Receiver 300 thus allows an analog signal to be processed by an analog receiver chain instead of by digital signal processing systems or components of a digital format processor. In this manner, the power requirements of receiver 300 may be reduced in comparison with known systems and methods, by allowing the analog signal to be processed by conventional analog format processors. In addition, receiver 300 uses common receiver components for both the analog and the digital signals, which reduces the number of components required and the power consumed by such redundant components.

FIG. 4 is a flow chart of a method 400 for receiving a transmitted signal that may be encoded in an analog or digital format, in accordance with an exemplary embodiment of the present invention. Method 400 may be used in a cellular handset device or in other suitable applications.

Method 400 begins at 402 where a transmitted signal is received. In one exemplary embodiment, the transmitted signal may be radio frequency electromagnetic radiation that has data encoded in either a digital or analog format. The method then proceeds to 404 where the transmitted signal is amplified. After the transmitted signal is amplified, the signal is filtered at 406 and the central frequency of the signal is shifted from a transmission frequency to an intermediate frequency at 408 for subsequent signal processing.

At 410, it is determined whether an analog or a digital format signal has been received. If an analog signal has been received at 410, then the method proceeds to 412 where the signal is filtered. The signal may be filtered using a filter that is configured for signals having a predetermined frequency band associated with analog signals, so as to exclude digitally encoded signals, spurious noise signals, or other unwanted signals. The method then proceeds to 414 where the signal is amplified. For example, the signal may be amplified using a limiter amplifier that generates a signal having a uniform amplitude. The method then proceeds to 416.

At 416, the amplified signal is transferred to an analog demodulator. In one exemplary embodiment, the analog demodulator may be a frequency modulation demodulator, or other suitable demodulators. The method then proceeds to 418, where the analog signal is decoded using analog format decoding system or method. For example, if the signal has been encoded according to the AMPS standard format, then a standard AMPS processing system or component may be used to extract signaling data, control data, payload data, and other suitable data.

If it is determined that 410 that a digital signal has been received, then the method proceeds to 420. At 420, the signal is filtered. The signal may be filtered so as to pass signals in a predetermined frequency band associated with a first digital signaling format standard, or may be filtered to pass other suitable signals. Likewise, additional dual or multiple mode receiver chains and filtering chains may be used in accordance with an exemplary embodiment of the present invention. The method then proceeds to 422, where the signal is amplified. For example, the signal may be amplified using a variable gain amplifier that generates an output having a predetermined amplitude, such as a predetermined maximum amplitude or a predetermined average peak amplitude. The method then proceeds to 424 where the signal is split into an I signal channel and a Q signal channel for subsequent processing by a digital format decoding system. The method then proceeds to 426 where the digital signal is decoded.

In operation, method 400 can be used to receive a signal that may be encoded in an analog or digital format, in particular, where the digital format may be two or more different digital formats. Method 400 may be used to process the analog signal using low power analog signal processing systems and components, instead of using digital signal processing. Such digital processing may require more power than analog signal processing, and thus results in shorter standby time, shorter battery life, and other commercially undesirable effects. In contrast to such known methods for processing a signal that may be received in either an analog or digital format, method 400 allows analog and digital signal processing to be accomplished using systems and components that have optimum power consumption characteristics for the type of signal format to be processed.

FIG. 5 is a flow chart of the method 500 for receiving a transmitted signal in accordance with an exemplary embodiment of the present invention. Method 500 may be used to receive a signal that has been encoded in either an analog or digital format.

Method 500 begins at step 502 where a transmitted signal is received. The transmitted signal may be received using a cellular handset antenna or other suitable antennas. The method then proceeds to 504 where the received transmitted signal is amplified. For example, a low noise amplifier may be used to amplify the signal, so as to minimize noise signals that may be generated by the amplification process. The method then proceeds to 506.

At 506, the amplified signal is filtered. In one exemplary embodiment, different filters may be used for each different format, such as a filter for an analog format and another filter for a digital format. The method then proceeds to 508 where a reference frequency is generated, which may be, for example, a fractional local oscillator that allows reduction of in-band spurious signals. The reference frequency may be generated by a local oscillator, which may be selected so that the signal processing systems and components of a receiver operate within an optimal or predetermined frequency bandwidth. The method then proceeds to 510 where the center frequency of the transmitted signal is shifted to the center frequency of the reference frequency. For example, a mixer system may be used to multiply the reference frequency by the transmitted signal such that the output of the mixer system is a signal having the same relative frequency spectrum of the transmitted signal but which has been translated to have a center frequency that is equal to the difference between the signal and local oscillator frequencies. The method then proceeds to 512.

At 512, I/O demodulation processing is performed. The method then proceeds to 514 and the reference frequency signal is phase shifted. The phase shifted reference frequency signal is then used to demodulate in-phase and quadrature phase transmitted signals, such as by shifting the frequency of the transmitted signal 90 degrees in advance and 90 degrees lagging, and then by combining the two phase-shifted transmitted signals. The method then proceeds to 516.

At 516, it is determined whether an analog or digital format has been used to encode data into the transmitted signal. If an analog format has been used, the method proceeds to 518 where it is determined whether image reject processing has been performed. If image reject processing has not been performed, then the method proceeds to 522. If image reject processing has been performed, then the method proceeds to 520 where the signal is phase shifted to compensate for the phase shifting that is performed for image reject processing. The method then proceeds to 522.

At 522, the signal is filtered, such as to isolate the frequency band of the analog encoded data signals. The method then proceeds to 524 where the filtered transmitted signal is amplified, such as by a limiter amplifier. The method then proceeds to 526 where the signal is demodulated, such as with an FM demodulator. The signal is then decoded at 528, such as by using an analog format processor.

If it is determined at 516 that a digital signal has been received, then the method proceeds to 530 where the signal is split into an I channel signal and a Q channel signal. The method then proceeds to 532 where the I channel signal and the Q channel signal are filtered. At 534, each of the filtered signals are then amplified, such as by using a variable gain amp. DC offset correction is then performed at 536. For example, DC offset correction may be performed by passing the signal through a series of amplifiers and band pass filters which introduce an offset to compensate for any DC signal component. Gain imbalance between the in-phase and quadrature phase amplifiers is also corrected. The method then proceeds to 538 where the I channel signal and the Q channel signal are decoded, such as by using a digital format processor.

In operation, method 500 is used to process a transmitted signal that may include encoded data in either a digital or analog format. Method 500 also allows the signal to be processed so as to reject image signals that may be introduced into the signal by frequency shifting, and may further be used to compensate for DC offset. Method 500 thus allows a received signal to be processed for analog decoding or digital decoding in one or more formats, where each format may be decoded using methods, systems, and components that are optimized for that format, so as to decrease power consumption. Method 500 also uses common signal processing components for both formats, so as to reduce the amount of systems and components that would be required if separate systems were provided for each format.

Although preferred and exemplary embodiments of a system and method for receiving a signal have been described in detail herein, those skilled in the art will also recognize that various substitutions and modifications may be made to the systems and methods without departing from the scope and spirit of the appended claims.

What is claimed is:

1. A system for receiving a transmitted signal comprising:
  an image reject mixer receiving the transmitted signal and generating a received signal;
  a first receiver coupled to the image reject mixer, converting the received signal to a phase-corrected received signal and decoding the phase-corrected received signal according to a first demodulation format; and
  a second receiver coupled to the image reject mixer, decoding the received signal according to a second demodulation format.

2. The system of claim 1 wherein the first demodulation format is an analog format and the second demodulation format is a digital format.

3. The system of claim 1 wherein the image reject mixer further comprises:
  an amplifier receiving the transmitted signal and amplifying the transmitted signal; and
  a surface acoustic wave filter receiving the amplified transmitted signal and providing a filtered, amplified transmitted signal to the image reject mixer.

4. The system of claim 1 wherein the image reject mixer further comprises:
  a first band pass filter receiving the transmitted signal and passing signals having a frequency associated with the first demodulation format and the second demodulation format;

an amplifier receiving the filtered transmitted signal and amplifying the filtered transmitted signal; and a second band pass filter receiving the amplified and filtered transmitted signal and providing a filtered, amplified and filtered transmitted signal to the image reject mixer.

5. The system of claim 1 further comprising:

an analog format filter coupled between the image reject mixer and the first receiver and filtering the received signal in accordance with an analog format; and a digital format filter coupled between the image reject mixer and the second receiver and filtering the received signal in accordance with a digital format.

6. The system of claim 1 wherein the first receiver coupled to the image reject mixer, converting the received signal to the phase-corrected received signal and decoding the phase-corrected received signal according to the first demodulation format comprises:

a phase shifter coupled to the image reject mixer introducing a phase shift to compensate for the image reject mixer; and the first receiver coupled to the phase shifter and decoding the phase-shifted received signal according to the first demodulation format.

7. A system for receiving a transmitted signal comprising:

a first receiver converting the transmitted signal to an in-phase received signal and a quadrature-phase received signal according to a first demodulation format;

a phase shifter combining the in-phase received signal and the quadrature-phase received signal and shifting the combined signal; and a second receiver receiving the combined signal from the phase shifter and generating a second received signal according to a second demodulation format.

8. The system of claim 7 wherein the first receiver further comprises an in-phase image reject mixer receiving the transmitted signal and generating an in-phase received signal, and the second receiver converts the in-phase received signal to a phase-corrected second received signal.

9. The system of claim 8 wherein the second receiver further comprises a quadrature-phase image reject mixer receiving the transmitted signal and generating a quadrature-phase received signal.

10. The system of claim 9 further comprising a DC offset system correcting a DC offset of the in-phase received signal.

11. The system of claim 9 further comprising a DC offset system correcting a DC offset of the quadrature-phase received signal.

12. The system of claim 9 further comprising a DC offset system correcting a DC offset of the in-phase received signal and the quadrature-phase received signal.

13. A method for receiving a transmitted signal comprising:

image reject mixing the transmitted signal to generate a received signal;

demodulating the received signal according to a first demodulation format;

correcting a phase shift of the received signal; and demodulating the corrected received signal according to a second demodulation format.

14. The method of claim 13 wherein image reject mixing the transmitted signal to generate the received signal comprises image reject mixing the transmitted signal to generate an in-phase received signal and a quadrature-phase received signal.

15. The method of claim 14 wherein correcting the phase shift of the received signal comprises correcting the phase shift of the in-phase received signal.

16. The method of claim 15 wherein demodulating the corrected received signal according to the second demodulation format comprises demodulating the corrected in-phase received signal according to the second demodulation format.

17. The method of claim 13 wherein the first demodulation format is a digital format and the second demodulation format is an analog format.

18. The method of claim 13 further comprising filtering the transmitted signal in accordance with an analog transmission format and a digital transmission format prior to image reject mixing the transmitted signal to generate the received signal.

19. The method of claim 18 further comprising amplifying the filtered, transmitted signal prior to image reject mixing the filtered, transmitted signal to generate the received signal.

20. The method of claim 19 further comprising filtering the amplified and filtered transmitted signal in accordance with the analog transmission format and the digital transmission format prior to image reject mixing the transmitted signal to generate the received signal.

* * * * *